(12) United States Patent
Hsiao et al.

(10) Patent No.: US 12,462,012 B2
(45) Date of Patent: *Nov. 4, 2025

(54) HARDWARE-ASSISTED CLIENT AUTHENTICATION FOR SECURITY ENHANCEMENT OF VIRTUAL DEVICE

(71) Applicant: MEDIATEK INC., Hsinchu (TW)

(72) Inventors: Chih-Hsiang Hsiao, Hsinchu (TW); Pei-Lun Suei, Hsinchu (TW); Yingshiuan Pan, Hsinchu (TW); Yuchi Chu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 239 days.

This patent is subject to a terminal disclaimer.

(21) Appl. No.: 18/081,154

(22) Filed: Dec. 14, 2022

(65) Prior Publication Data

US 2023/0328053 A1    Oct. 12, 2023

Related U.S. Application Data

(60) Provisional application No. 63/327,907, filed on Apr. 6, 2022.

(51) Int. Cl.
  *G06F 21/45* (2013.01)
  *G06F 21/44* (2013.01)
  *H04L 9/40* (2022.01)

(52) U.S. Cl.
  CPC .............. *G06F 21/45* (2013.01); *G06F 21/44* (2013.01); *H04L 63/0823* (2013.01); *H04L 63/102* (2013.01)

(58) Field of Classification Search
  CPC ....... H04L 9/3226–3228; H04L 9/3263–3268; H04L 63/08; H04L 63/0807;
  (Continued)

(56) References Cited

U.S. PATENT DOCUMENTS 6,038,320 A    3/2000  Miller
8,522,018 B2   8/2013  Molina et al.
(Continued)

FOREIGN PATENT DOCUMENTS

CN        101146061 A    3/2008
WO    WO 2016/003858 A1   1/2016

OTHER PUBLICATIONS

Combined Taiwanese Office Action and Search Report Issued Jun. 30, 2023 in Taiwanese Application No. 112111472, (with English Translation of Search Categories), 4 pages.
(Continued)

*Primary Examiner* — Kevin Bechtel
(74) *Attorney, Agent, or Firm* — Winston Hsu

(57) ABSTRACT

A device can include a remote protocol communication (RPC) slot configured to receive a message package generated from an entity during an RPC process, a processing unit configured to process the message package and return a result via the RPC slot to the entity, a blocker configured to be enabled to block or disabled to allow communication between the RPC slot and the processing unit, a key slot corresponding to the RPC slot and configured to receive a key from the entity, a key pool configured to store key slot and key pairs, and a verifier configured to disable the blocker when the key matches a key contained in one of the key slot and key pairs that contains the key slot and enable the blocker when the key does not match the key contained in any one of the key slot and key pairs that contains the key slot.

3 Claims, 7 Drawing Sheets

(58) Field of Classification Search
CPC ......... H04L 63/0823–0846; H04L 63/10–102; H04L 63/20; G06F 21/44–45
See application file for complete search history.

(56) References Cited

U.S. PATENT DOCUMENTS

| | | |
|---|---|---|
| 10,341,321 B2 | 7/2019 | Kumar et al. |
| 2014/0165147 A1* | 6/2014 | Hershberg ............ H04L 63/083 726/4 |
| 2019/0058714 A1* | 2/2019 | Joshi ................... H04L 63/0823 |
| 2019/0141139 A1 | 5/2019 | Singhal |
| 2020/0204527 A1* | 6/2020 | Vass ................... H04L 63/0428 |
| 2022/0060455 A1 | 2/2022 | Rosenstein et al. |

OTHER PUBLICATIONS

Extended European Search Report issued on Aug. 21, 2023 in European Patent Application No. 23165931.9, 7 pages.

\* cited by examiner

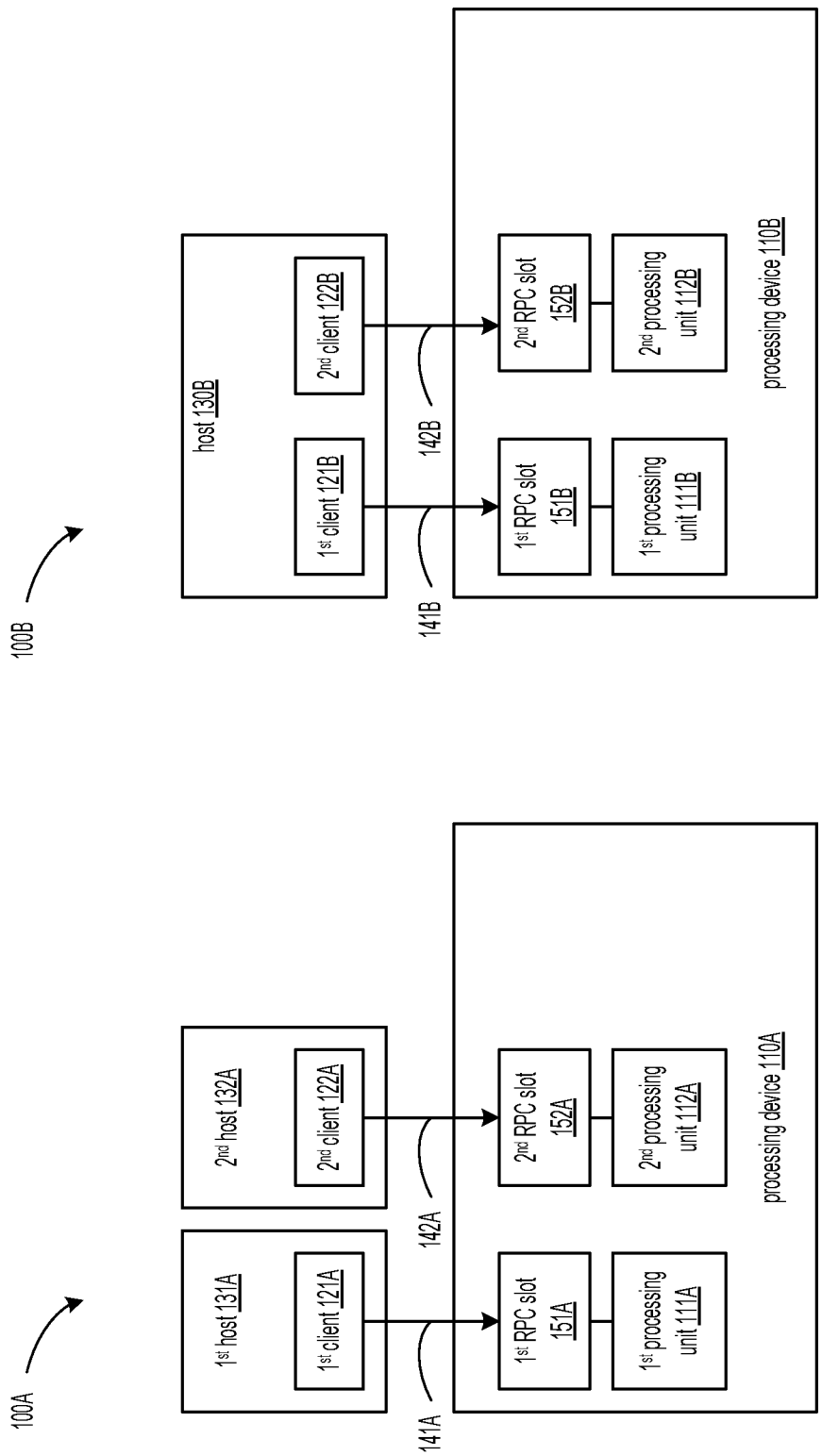

HARDWARE-ASSISTED CLIENT AUTHENTICATION FOR SECURITY ENHANCEMENT OF VIRTUAL DEVICE

CROSS-REFERENCE TO RELATED APPLICATIONS

This application is based on, and claims the benefit of priority to, provisional application No. 63/327,907, filed Apr. 6, 2022, the entire contents of which are incorporated herein by reference.

TECHNICAL FIELD

The present disclosure relates to virtual devices, and specifically relates to client authentication for security enhancement of virtual devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A virtual processor is introduced to allow multiple clients or hosts to be run thereon. The clients can be included in a single host, or be included in multiple hosts.

SUMMARY

Aspects of the present disclosure provide a device. For example, the device can include a remote protocol communication (RPC) slot, a processing unit, a blocker, a key slot, a key pool and a verifier. The RPC slot can be configured to receive a message package generated from an entity during an RPC process. The processing unit can be configured to process the message package and return a result via the RPC slot to the entity. The blocker can be coupled between the RPC slot and the processing unit. The blocker can be configured to be enabled to block communication between the RPC slot and the processing unit or to be disabled to allow the communication between the RPC slot and the processing unit. The key slot can correspond to the RPC slot and be configured to receive a first key from the entity. The key pool can be configured to store one or more key slot and key pairs. The verifier can be coupled to the blocker, the key slot and the key pool. The verifier can be configured to disable the blocker when the first key matches a key contained in one of the key slot and key pairs that contains the key slot and enable the blocker when the first key does not match the key contained in any one of the key slot and key pairs that contains the key slot.

In an embodiment, the device can further include a key manager that is coupled between the key slot and the key pool. The key manager can be configured to store a key slot and key pair that contains the first key and the key slot into the key pool when the key slot is not contained in any one of the key slot and key pairs.

In an embodiment, the key manager is further configured to receive a second key from the entity, generate the first key that corresponds to the second key, and send the first key to the entity. In another embodiment, the device can further include an eRoT that is coupled to the key manager. The eRoT can be configured to generate the first key that corresponds to the second key. In some embodiments, the device can further include a counter that is coupled to the verifier and the key manager. The counter can be configured to count a number of times that the first key is inserted into the key slot. In an embodiment, when the number of times exceeds a threshold of times, the counter can send an invalid signal to the key manager, and the key manager can un-register the first key, delete the key slot and key pair stored in the key pool that contains the first key, and send a notification signal to the entity.

In an embodiment, the key manager is further configured to receive a handle from the entity, derive the first key from the handle, and send the first key to the entity. In another embodiment, the device can further include an eRoT that is coupled to the key manager. The eRoT can be configured to derive the first key from the handle.

Aspects of the present disclosure further provide a method. For example, the method can include receiving in a remote protocol communication (RPC) slot a message package generated from an entity during an RPC process, receiving in a key slot a first key from the entity, and processing the message package and returning a corresponding result via the RPC slot to the entity when the first key matches a key contained in one of one or more key slot and key pairs stored in a key pool that contains the key slot.

In an embodiment, the method can further include storing a key slot and key pair that contains the first key and the key slot into the key pool when the key slot is not contained in any one of the key slot and key pairs. In some embodiments, the method can further include receiving a second key from the entity, generating the first key that corresponds to the second key, and sending the first key to the entity. For example, the method can further include generating the first key that corresponds to the second key by using an eRoT.

In an embodiment, the method can further include counting a number of times that the first key is received in the key slot, and un-registering the first key, deleting the key slot and key pair stored in the key pool that contains the first key and sending a notification signal to the entity when the number of times exceeds a threshold of times.

In an embodiment, the method can further include receiving a handle from the entity, deriving the first key from the handle, and sending the first key to the entity. For example, deriving the first key from the handle can include deriving the first key from the handle by using an eRoT.

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein:

FIG. 1A is a functional block diagram of a first multi-client system;

FIG. 1B is a functional block diagram of a second multi-client system;

DETAILED DESCRIPTION OF EMBODIMENTS

Figure 2B:
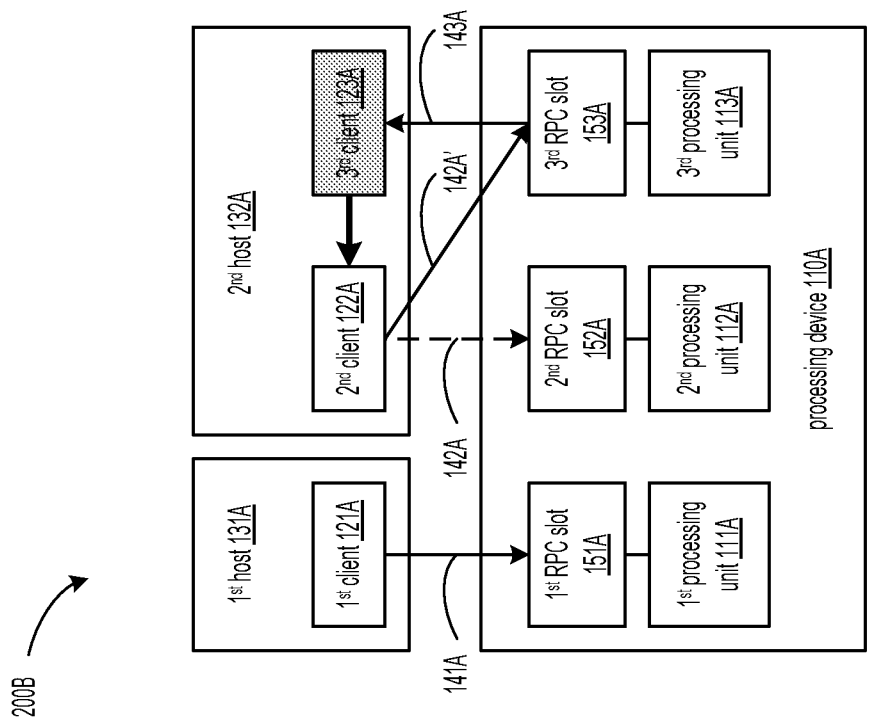
FIG. 2B is a functional block diagram of a fourth multi-client system.

Remote procedure communication (RPC) process, e.g., a remote procedure call process, can be used for an operating system (OS) to be run on a remote processing unit. There are some security issues in implementing the RPC process, such as whether the client is sending message packages to the correct remote machine (e.g., processing units) and whether a server (e.g., processing units) is accepting message packages only from legitimate clients. According to the present disclosure, a key slot and a key are introduced. The server will accept the message packages from the client and the client will send the message packages to the server only when the key slot and the key inserted into the key slot are matched.

FIG. 1A is a functional block diagram of a first multi-client system 100A. The first multi-client system 100A can be implemented in a mobile phone. The first multi-client system 100A can include one or more clients, e.g., a first client 121A and a second client 122A, which can be included in two different hosts, e.g., a first host 131A and a second host 132A, respectively. In an embodiment, the first client 121A and the second client 122A can be included in two independent operating systems (OSs), e.g., a first OS 121A and a second OS 122A, respectively ("the first client 121A" and "the first OS 121A" are used interchangeably, and "the second client 122A" and "the second OS 122A" are used interchangeably hereinafter). In some embodiments, the first client 121A and the second client 122A can be assigned different security levels. For example, the first client 121A is assigned a high security level, while the second client 122A is assigned a low security level. The first multi-client system 100A can further include a processing device 110A, e.g., a central processing unit (CPU) or an accelerated processing unit (APU).

In order to run the first OS 121A and the second OS 122A individually in a parallel manner, the physical processing device 110A, which includes two or more processing cores and/or two or more processing threads, can be partitioned into a plurality of virtual processing units, e.g., a first processing unit (e.g., a first vAPU) 111A and a second processing unit (e.g., a second vAPU) 112A. For example, the first vAPU 111A and the second vAPU 112A can be scheduled and controlled by a virtual machine monitor (VMM) or a hypervisor (not shown) to run the first OS 121A and the second OS 122A, respectively, in a parallel manner.

The first OS 121A and the second OS 122A can access the resources of the first vAPU 111A and the second vAPU 112A by invoking a remote protocol communication (RPC) process, e.g., a remote procedure call process, to establish individual RPC channels, e.g., a first RPC channel 141A and a second RPC channel 142A, with the first vAPU 111A and the second vAPU 112A at a first RPC slot 151A and a second RPC slot 152A, respectively. In the RPC process, a client, e.g., the first client 121A and the second client 122A, makes an RPC call by sending a request to a known remote server, e.g., the first vAPU 111A and the second vAPU 112A, to execute a specified procedure with a message package including parameters and identifiers (e.g., included in a message ID field of the message package), and the server returns a corresponding result of the procedure to the client.

FIG. 1B is a functional block diagram of a second multi-client system 100B. In the second multi-client system 100B, a first client (e.g., a first app that is assigned a low security level) 121B and a second client (e.g., a second app that is assigned a high security level) 122B can access the resources of a first processing unit (e.g., a first vAPU) 111B and a second processing unit (e.g., a second vAPU) 112B that are formed by partitioning a processing device 110B, by invoking the RPC process to establish a first RPC channel 141B and a second RPC channel 142B with the first vAPU 111B and the second vAPU 112B at a first RPC slot 151B and a second RPC slot 152B, respectively. The second multi-client system 100B differs from the first multi-client system 100A in that in the second multi-client system 100B the first client 121B and the second client 122B are included in the same host, e.g., a host 130B.

There are some security issues in implementing the RPC process, such as whether the client is sending message packages to the correct remote machine (e.g., processing units) or whether the remote machine is an impostor, and whether the server (e.g., processing units) is accepting message packages only from legitimate clients or whether the server can identify the client at the client side. For example, in a third multi-client system 200A shown in FIG. 2A the processing device 110A does not have the capability to identify whether a third client 123A that is included in a third host 133A is the client, i.e., the second client 122A, who has accessed the resources of the second vAPU 112A at the second RPC slot 152A via the second RPC channel 142A. Therefore, the third client 123A, who may be a hacker, can also access the resources of the second vAPU 112A via the second RPC channel 142A at the second RPC slot 152A and tamper and/or hijack the data of the second client 122A, if the third client 123A has the knowledge about the second RPC slot 152A. As another example, in a fourth multi-client system 200B shown in FIG. 2B an imposter, e.g., the third client 123A, who is also included in the second host 132A, establishes a third RPC channel 143A with a third processing unit (e.g., a third vAPU) 113A of the processing device 110A at a third RPC slot 153A, attempting to "trap" the second client 122A to access the third vAPU 113A at the third RPC slot 153A via a "trap" second RPC channel 142A', which he thinks to be the second vAPU 112A, the second RPC slot 152A and the second RPC channel 142A, respectively. Therefore, the third client 123A can access the resources of the third vAPU 113A via the third RPC channel 143A at the third RPC slot 153A and tamper and/or hijack the data of the second client 122A.

Figure 3:
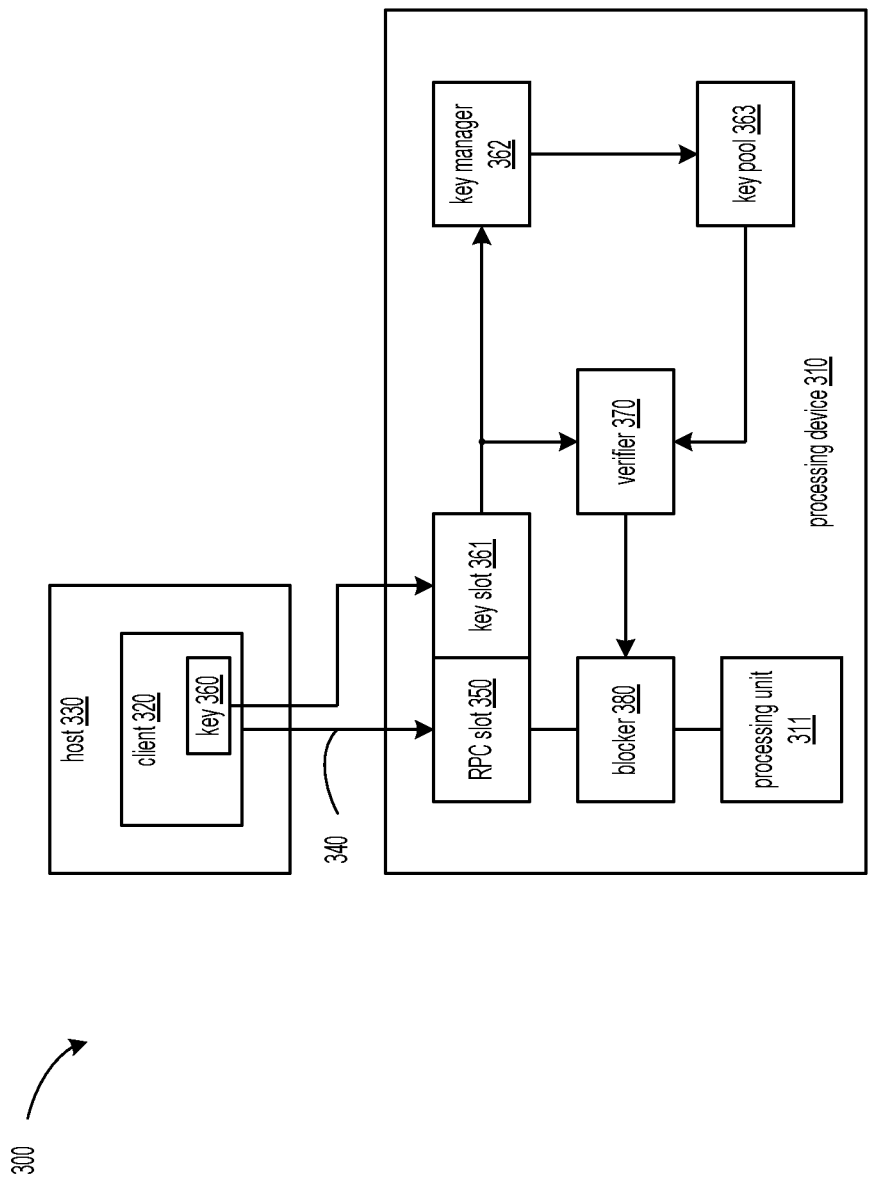
FIG. 3 is a functional block diagram of an exemplary multi-client system of a first embodiment according to the present disclosure.

FIG. 3 is a functional block diagram of an exemplary multi-client system 300 of a first embodiment according to the present disclosure. A key slot and a key are introduced in the multi-client system 300 to address the security issues mentioned above. The multi-client system 300 can be implemented in a mobile phone. The multi-client system 300 can include one or more clients, e.g., a client 320, which can be included in one or more hosts, e.g., a host 330. In an embodiment, the client 320 can be included in an OS, e.g., an OS 320 ("the client 320" and "the OS 320" are used interchangeably hereinafter). The multi-client system 300 can further include a processing device 310A, e.g., a central processing unit (CPU) or an accelerated processing unit (APU). In an embodiment, the physical processing device 310 can include two or more processing cores and/or two or more processing threads, and thus can be partitioned into a plurality of virtual processing units, e.g., a processing unit (e.g., a vAPU) 311. The OS 320 can access the resources of the vAPU 311 by invoking the RPC process, for example, to establish an RPC channel 340 with the vAPU 311 at an RPC slot 350.

In an embodiment, the client 320 can be assigned a key 360, and the processing device 310 can further include a key slot 361, a key manager 362 coupled to the key slot 361, a key pool 363 coupled to the key manager 362, a verifier 370 coupled to the key slot 361 and the key pool 363, and a blocker 380 coupled between the verifier 370, the RPC slot 350 and the processing unit 311.

In an embodiment, the key 360 can be received and inserted in the key slot 361, which is writable only and is, for example, a register, and registered by the key manager 362, and a corresponding key slot and key pair can be stored into the key pool 363 accordingly. For example, during vAPU initiation to invoke the RPC process to establish the RPC channel 340 with the processing unit 311 at the RPC slot 350, in addition to sending a request to the vAPU 311 to execute a specified procedure with a message package, the client 320 can also send/insert the key 360, which is not registered yet, to/into the key slot 361, which is empty (or unlocked) and corresponds to the RPC slot 350.

The key pool 363 can be configured to store key slot and key pairs. In an embodiment, the key pool 363 can be implemented by using software or cooperate with security storage components on a system on chip (SoC).

The key manager 362 can be configured to register a key that is inserted into an unlocked key slot, and store a corresponding key slot and key pair into the key pool 363. For example, the key manager 362, if determining that the key 360 does not match the key contained in any one of the key slot and key pairs stored in the key pool 363, which indicates that the client 320 is the first client who attempts to establish the RPC channel 340 with the processing unit 311 at the RPC slot 350, can register the key 360 and store the corresponding key slot (i.e., the key slot 361) and key (i.e., the key 360) pair into the key pool 363, and lock the key slot 361 accordingly, which indicates that the key manager 362 will not register another key when inserted into the locked key slot 361. In an embodiment, the key manager 362 can be implemented by using software or cooperate with security components on a SoC.

The blocker 380 can be controlled by the verifier 370 to be enabled to block communication between the RPC slot 350 and the processing unit 311 or to be disabled to allow the communication between the RPC slot 350 and the processing unit 311. In an embodiment, the blocker 380 can be implemented by using software or hardware.

The verifier 370 can verify whether a key that is inserted into the key slot 361 is the key that corresponds to the key slot 361 and, accordingly, the RPC slot 350, and control the blocker 380 to operate based on the verifying result. In an embodiment, the verifier 370 can disable the blocker 380 when the key inserted into the key slot 361 matches a key contained in one of the key slot and key pairs that contains the key slot 361, and enable the blocker 380 when the key inserted into the key slot 361 does not match the key contained in any one of the key slot and key pairs that contains the key slot 361. In an embodiment, the verifier 370 can be implemented by using software or hardware.

For example, when the client 320 sends a request to the vAPU 311 to execute a specified procedure with a message package and inserts the key 360 into the key slot 361, the verifier 370 can check the key pool 363 and verify that the key slot (i.e., the key slot 361) and key (i.e., the key 360) pair matches one of the key slot and key pairs stored in the key pool 363 that contains the key slot 361, and control the blocker 380 to allow the message package to be transferred from the RPC slot 350 to the processing unit 311 and the result of the procedure to be transferred from the processing unit 311 to the RPC slot 350 and to the client 320 via the RPC channel 340. The client 320 has to insert the key 360 into the key slot 361 for every transition.

As another example, when another client sends a request to the vAPU 311 to execute a specified procedure with a message package and inserts another key into the key slot 361 (which corresponds to the RPC slot 350), the verifier 370 can verify that the another key is not the key 360 that should be inserted into the key slot 361 as the key slot (i.e., the key slot 361) and another key pair does not match any one of the key slot and key pairs stored in the key pool 363 that contains the key slot 361, and thus control the blocker 380 to block the message package from being transferred to the processing unit 311. Therefore, the another client cannot access the resources of the vAPU 311 and tamper and/or hijack the data of the client 320.

During vAPU de-initiation, the key manager 362 can un-register the key 360, delete the key slot (i.e., the key slot 361) and key (i.e., the key 360) pair stored in the key pool 363, and unlock the key slot 361, for another key to be inserted thereinto and registered.

Figure 2A:
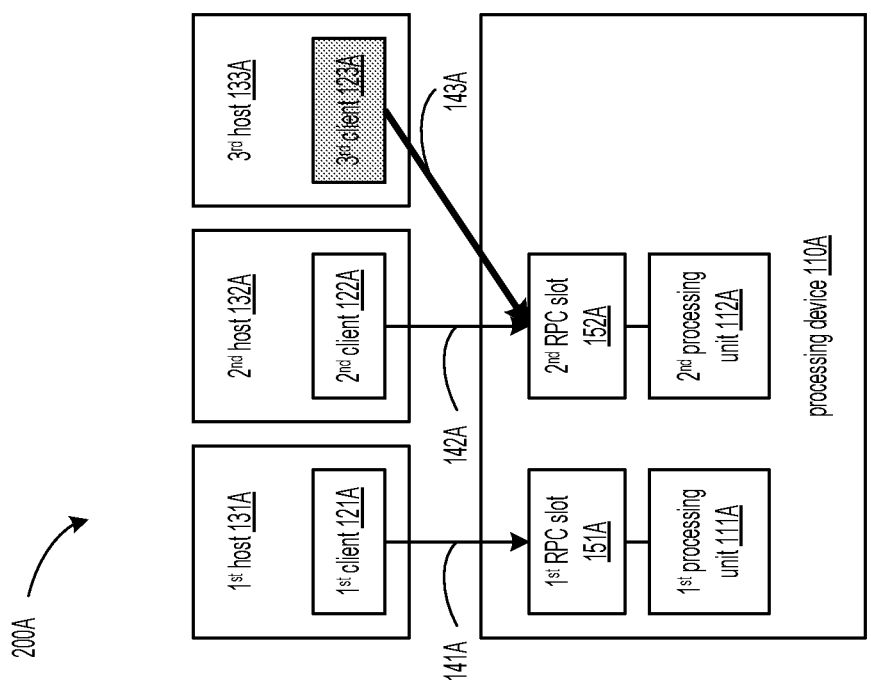
FIG. 2A is a functional block diagram of a third multi-client system.

Referring back to the case scenario shown in FIG. 2A, as the third client 123A does not have the key 360, the verifier 370 will enable the blocker 380 to block the communication between the RPC slot 350 and the processing unit 311 when the third client 123A is attempting to access the resources of the processing unit 311 at the RPC slot 350 even if the third client 123A has the full knowledge about the RPC slot 350. Referring back to the case scenario shown in FIG. 2B, as the second client 122A does not have a key that the third client 123A owns and is required to be inserted into a key slot that corresponds to the third RPC slot 153A in order to establish the third RPC channel 143A with the third processing unit 113A at the third RPC slot 153A, the second client 122A cannot and will not be trapped to access the resources of the third processing unit 113A at the third RPC slot 153.

Figure 4:
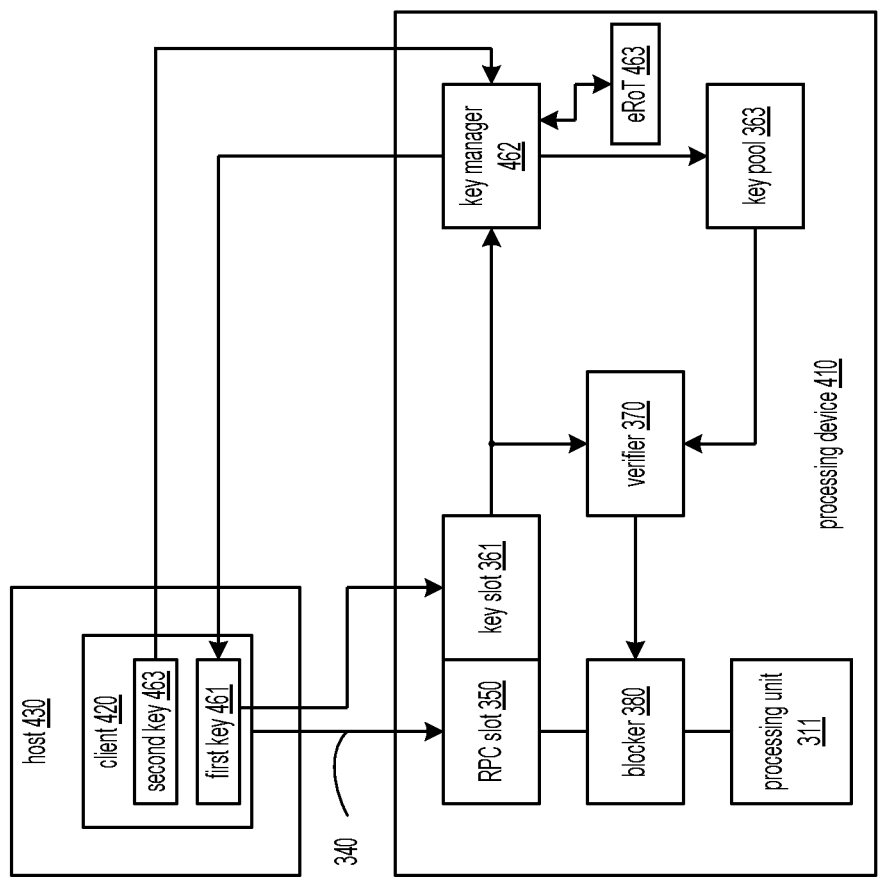
FIG. 4 is a functional block diagram of an exemplary multi-client system of a second embodiment according to the present disclosure.

FIG. 4 is a functional block diagram of an exemplary multi-client system 400 of a second embodiment according to the present disclosure. The multi-client system 400 can be implemented in a mobile phone. The multi-client system 400 can include a host 430 and a processing device 410. In an embodiment, the host 430 can include a client 420 who has at least two keys, e.g., a second key (e.g., a primary, permanent key) 464 and a first key (e.g., a secondary, temporary key) 461 that is derived from the second key 464 and can be shorter than the second key 464. The processing device 411 can also include the RPC slot 350, the key slot 361, the blocker 380, the verifier 370, the processing unit 311 and the key pool 363. Different from the processing device 310, which includes the key manager 362, the processing device 410 can include a key manager 462, which can not only register a key and store a corresponding key slot and key pair into the key pool 363, but also generate the first key 461 based on the second key 464 and send the first key 461 to the client 420. Therefore, the client 420 can insert the newly generated first key 461 into the key slot 361. In an embodiment, the processing device 410 can further include an eRoT 463 that is coupled to the key manager 462, configured to generate the first key 461 based on the second key 464.

For example, before attempting to establish the RPC channel 340 with the processing unit 311 at the RPC slot 350, the client 420 can send the second key 464 to the key manager 462, and the key manager 462 will generate the first key 461 based on the second key 464 and send the first key 461 to the client 420. As another example, when attempting to establish the RPC channel 340 with the processing unit 311 at the RPC slot 350, the client 420 can send a request to the vAPU 311 to execute a specified procedure with a message package and insert the first key 461 into the key slot 361, which is empty and unlocked, the key manager 462 can register the first key 461 and store a corresponding key slot (e.g., the key slot 361) and key (e.g., the first key 461) pair into the key pool 363, and the verifier 370 can control the blocker 380 to allow the message package to be transferred from the RPC slot 350 to the processing unit 311 and the result of the procedure to be transferred from the processing unit 311 to the RPC slot 350 and to the client 420 via the RPC channel 340. The client 420 has to insert the first key 461 into the key slot 361 for every transition. Therefore, another client who is without the first key 461 cannot access the resources of the processing unit 311 as the key slot 361 does not receive the first key 461 and the verifier 370 will enable the blocker 380 to block the communication between the RPC slot 350 and the processing unit 311.

Figure 5:
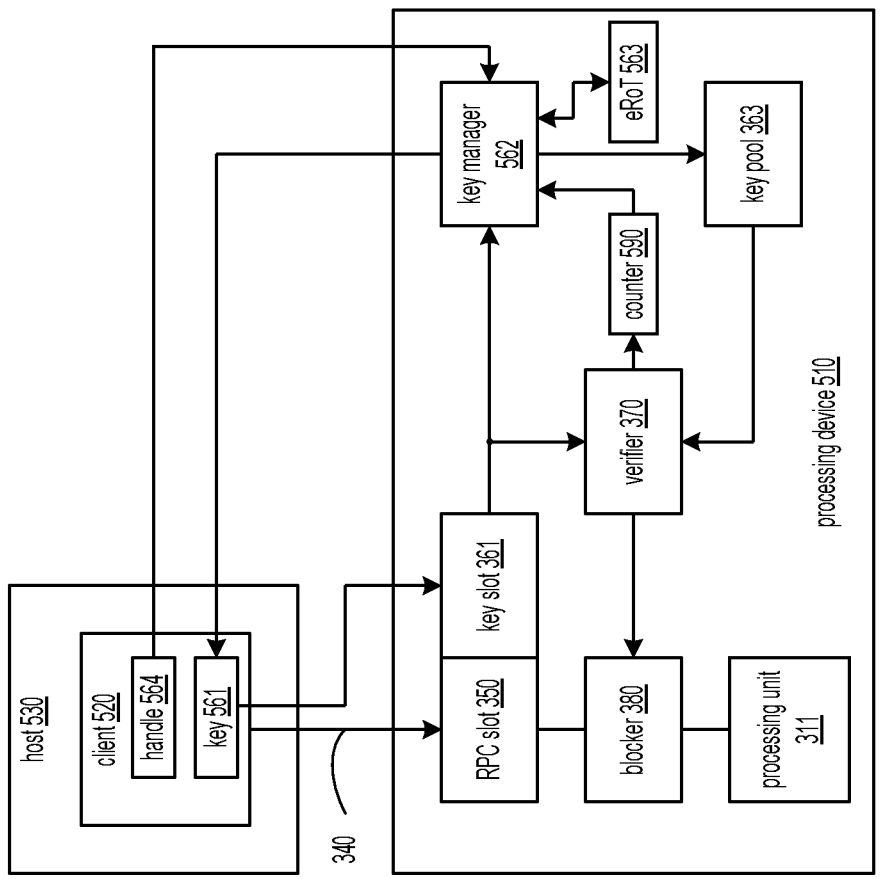
FIG. 5 is a functional block diagram of an exemplary multi-client system of a third embodiment according to the present disclosure.

FIG. 5 is a functional block diagram of an exemplary multi-client system 500 of a third embodiment according to the present disclosure. The multi-client system 500 can be implemented in a mobile phone. The multi-client system 500 can include a host 530 and a processing device 510. In an embodiment, the host 530 can include a client 520 who has a handle 564 and a key 561 that is derived from the handle 564. The processing device 510 can also include the RPC slot 350, the key slot 361, the blocker 380, the verifier 370, the processing unit 311 and the key pool 363. Different from the processing device 410, which includes the key manager 462, the processing device 510 can include a key manager 562, which can register a key and store a corresponding key slot and key pair into the key pool 363, derive the key 561 from the handle 564, and send the key 561 to the client 520. Therefore, the client 520 can insert the newly generated key 561 into the key slot 361. In an embodiment, the processing device 510 can further include an eRoT 563 that is coupled to the key manager 562, configured to derive the key 561 from the handle 564.

In the exemplary embodiment shown in FIG. 5, the processing device 510 can further include a counter 590 coupled between the verifier 370 and the key manager 562, configured to count a number of times that the key 561 has been inserted into the key slot 361 and send an invalid signal to the key manager 562 when the number of times exceeds a threshold of time. In response to the invalid signal, the key manager 562 will un-register the key 561 and delete the key slot (e.g., the key slot 361) and key (e.g., the key 561) pair stored in the key pool 363, and send a notification signal to the client 520 for new registration.

For example, before attempting to establish the RPC channel 340 with the processing unit 311 at the RPC slot 350, the client 520 can send the handle 564 to the key manager 562, and the key manager 562 will derive the key 561 from the handle 564 and send the key 561 to the client 520. As another example, when attempting to establish the RPC channel 340 with the processing unit 311 at the RPC slot 350, the client 520 can send a request to the vAPU 311 to execute a specified procedure with a message package and insert the key 561 into the key slot 361, which is empty and unlocked, the key manager 562 can register the key 561 and store a corresponding key slot (e.g., the key slot 361) and key (e.g., the key 561) pair into the key pool 363, and the verifier 370 can control the blocker 380 to allow the message package to be transferred from the RPC slot 350 to the processing unit 311 and the result of the procedure to be transferred from the processing unit 311 to the RPC slot 350 and to the client 520 via the RPC channel 340. The client 520 has to insert the key 561 into the key slot 361 for every transition. Therefore, another client who is without the key 561 cannot access the resources of the processing unit 311 as the key slot 361 does not receive the key 561 and the verifier 370 will enable the blocker 380 to block the communication between the RPC slot 350 and the processing unit 311. As the number of times that the key 561 has inserted into the key slot 361 increases and exceeds the threshold of times eventually, the counter 590 will send the invalid signal to the key manager 562, and the key manager 562 will un-register the key 561, delete the key slot (e.g., the key slot 361) and key (e.g., the key 561) pair stored in the key pool 363, and send the notification signal to the client 520 for new registration.

Figure 6:
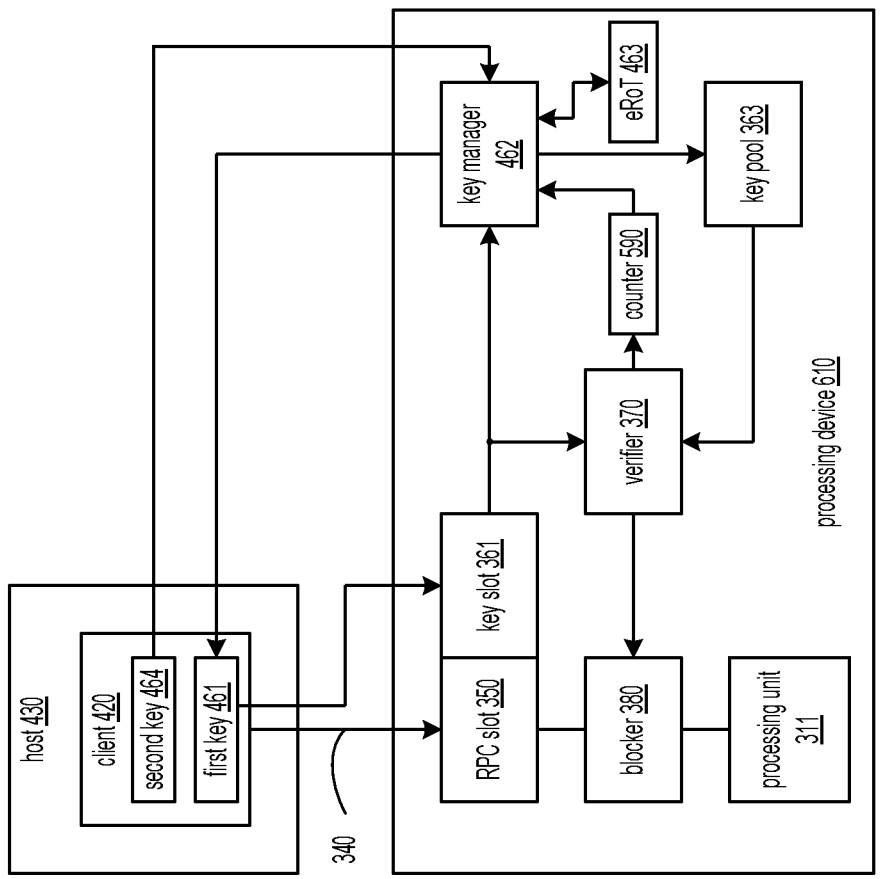
FIG. 6 is a functional block diagram of an exemplary multi-client system of a fourth embodiment according to the present disclosure.

FIG. 6 is a functional block diagram of an exemplary multi-client system 600 of a fourth embodiment according to the present disclosure. The multi-client system 600 can be implemented in a mobile phone. The multi-client system 600 differs from the multi-client system 500 in that the host 430, the key manager 462 and the eRoT 463 replace the host 530, the key manager 562 and the eRoT 563 of the multi-client system 500, respectively. The operation of the multi-client system 600 can be understood by referring to the descriptions of the multi-client systems 400 and 500, further description thereof hereby omitted.

Figure 7:
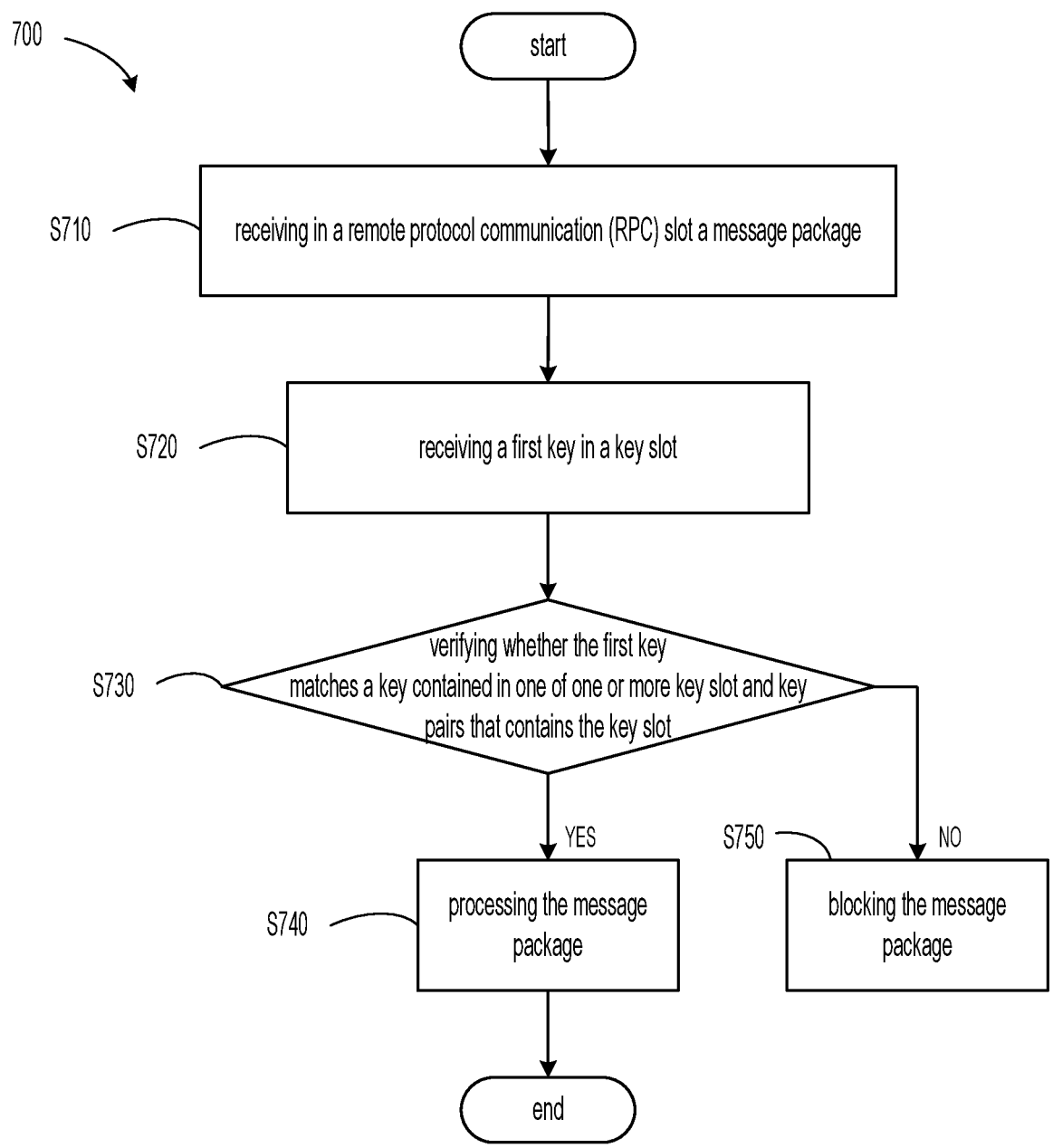
FIG. 7 is a flow chart of an exemplary method according to some embodiments of the present disclosure.

FIG. 7 is a flow chart of an exemplary method 700 according to some embodiments of the present disclosure. In various embodiments, some of the steps of the method 700 shown can be performed concurrently or in a different order than shown, can be substituted by other method steps, or can be omitted. Additional method steps can also be performed as desired. Aspects of the method 700 can be implemented by a wireless device, such as a mobile phone, in which a multi-client system, such as the multi-client systems 300, 400, 500 and 600, is implemented.

At step S710, a message package generated from an entity during an RPC process is received in a remote protocol communication (RPC) slot. For example, the message package can be received in the RPC slot 350 of any one of the processing devices 310, 410, 510 and 610.

At step S720, a first key can be received in a key slot from the entity. For example, the first key can be received in the key slot 361 of any one of the processing devices 310, 410, 510 and 610.

At step S730, it is to be verified as to whether the first key matches a key contained in one of one or more key slot and key pairs that contains the key slot. For example, the first key can be verified by the verifier 370 of any one of the processing devices 310, 410, 510 and 610 as to whether it is contained in one of the key slot and key pairs stored in the key pool 363 that contains the key slot 361. The method 700 can proceed to step S740 when the first key is verified to be contained in one of the key slot and key pairs that contains the key slot, or proceed to step S750 when the first key is verified to be not contained in one of the key slot and key pairs that contains the key slot.

At step S740, the message package is processed and a corresponding result is sent to the entity. For example, the verifier 370 can disable the blocker 380 when the first key is contained in one of the key slot and key pairs that contains the key slot to allow the communication between the RPC slot 350 and the processing unit 311, and the processing unit 311 can process the message package and return a corresponding result via the RPC slot 350 to the entity.

At step S750, the message package is blocked from being processed. For example, the verifier 370 can enable the blocker 380 when the first key is not contained in one of the key slot and key pairs that contains the key slot to block the communication between the RPC slot 350 and the processing unit 311.

In an embodiment, the method 700 can further include storing a key slot and key pair that contains the first key and the key slot into the key pool when the key slot is not contained in any one of the key slot and key pairs. For example, the key manager 362 can store the key slot (i.e., the key slot 361) and key (i.e., the first key) pair that contains the first key and the key slot into the key pool 363 when the key slot is not contained in any one of the key slot and key pairs.

In another embodiment, the method 700 can further include receiving a second key from the entity, generating the first key that corresponds to the second key, and sending the first key to the entity. For example, the key manager 462 can receive a second key 462 from the client 420, generate the first key 461 that corresponds to the second key 462, and send the first key 461 to the client 420. In an embodiment, an eRoT, e.g., the eRoT 563, can be used to generate the first key that corresponds to the second key.

In some embodiments, the method 700 can further include counting a number of times that the first key is received in the key slot, and un-registering the first key, deleting the key slot and key pair stored in the key pool that contains the first key and sending a notification signal to the entity when the number of times exceeds a threshold of times. For example, the counter 590 can count a number of times that the first key is received in the key slot 361 and send the invalid signal to the key manager 562 as the number of times that the first key (e.g., the key 561) has inserted into the key slot 361 exceeds the threshold of times, and the key manager 562 will un-register the first key, delete the key slot (e.g., the key slot 361) and key (e.g., the key 561) pair stored in the key pool 363, and send the notification signal to the entity (e.g., the client 520) for new registration.

In an embodiment, the method 700 can further include receiving a handle from the entity, deriving the first key from the handle, and sending the first key to the entity. For example, the entity, e.g., the client 520, can send the handle 564 to the key manager 562, and the key manager 562 will derive the first key, e.g., the 561, from the handle 564 and send the first key to the entity. In an embodiment, an eRoT, e.g., the eRoT 563, can be used to derive the first key from the handle.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of a processing device comprising multiple clients, the method comprising:
   receiving a second key from a first client within the multiple clients;
   generating a first key based on the second key, wherein the first key is shorter than the second key;
   storing a key slot and key pair that contains the first key and the key slot into a key pool storing one or more key slot and key pairs when the key slot is not contained in any one of the key slot and key pairs;
   sending the first key to the first client;
   receiving, in a remote protocol communication (RPC) slot, a first message package generated from the first client during an RPC process;
   receiving the first key from the first client, and inserting the first key into a key slot of the RPC slot;
   determining whether the first key inserted into the key slot matches a key contained in one of the one or more key slot and key pairs stored in the key pool that contains the key slot, wherein the first key matches a key contained in one of the one or more key slot and key pairs;
   processing the first message package and returning a corresponding result via the RPC slot to the first client, since the first key matches a key contained in one of the one or more key slot and key pairs stored in the key pool that contains the key slot;
   receiving, in the remote protocol communication (RPC) slot, a second message package generated from a second client within the multiple clients during an RPC process;
   receiving a third key from the second client, and inserting the third key into the key slot of the RPC slot;
   determining whether the third key inserted into the key slot matches a key contained in one of the one or more key slot and key pairs stored in the key pool that contains the key slot, wherein the third key does not match any key contained in the one or more key slot and key pairs; and
   blocking processing of the second message package, since the third key does not match any key contained in one of the one or more key slot and key pairs stored in the key pool that contains the key slot.

2. The method of claim 1, further comprising:
   generating the first key that corresponds to the second key by using an extended root of trust (eROT) circuit.

3. The method of claim 1, further comprising:
   counting a number of times that the first key is received in the key slot; and
   un-registering the first key, deleting the key slot and key pair stored in the key pool that contains the first key and sending a notification signal to the first client when the number of times exceeds a threshold of times.

* * * * *